United States Patent [19]

Lafferty

[11] Patent Number: 4,768,279
[45] Date of Patent: Sep. 6, 1988

[54] WHEEL ALIGNMENT TOOL

[75] Inventor: Robert J. Lafferty, Kansas City, Mo.

[73] Assignee: Roy Ownby, Riverside, Mo. ; a part interest

[21] Appl. No.: 882,139

[22] Filed: Jul. 3, 1986

[51] Int. Cl.⁴ ............................................. B23P 19/06
[52] U.S. Cl. ..................................... 29/525.1; 29/273
[58] Field of Search .................. 29/526 R, 273; 301/9

[56] References Cited

U.S. PATENT DOCUMENTS

| 1,624,356 | 4/1927 | Nelson | 29/273 |
|---|---|---|---|
| 1,815,821 | 7/1931 | Baker | 29/273 |
| 2,051,953 | 8/1936 | Leathers | 85/32 |
| 2,340,986 | 2/1944 | Roberts et al. | 29/84 |
| 2,499,758 | 3/1950 | Kayfetz | 29/273 |
| 2,555,698 | 6/1951 | Masheck | 29/273 |
| 2,640,728 | 6/1953 | Slack | 301/9 |
| 2,640,729 | 6/1953 | Niven | 301/9 |
| 4,097,979 | 7/1978 | Interdonato | 29/273 |

Primary Examiner—P. W. Echols
Assistant Examiner—Andrew E. Rawlins
Attorney, Agent, or Firm—Michael Yakimo, Jr.

[57] ABSTRACT

A tool and method for mounting a vehicle wheel comprising an elongated body having an integral tapered head and support housing. The tapered head is inserted through a vehicle wheel aperture so as to receive a lug bolt therein protruding from the vehicle hub. Reception of a lug bolt within the central bore aligns the lug bolt within the wheel aperture and maintains such alignment. This relationship allows the remaining lug bolt/aperture combinations to be properly aligned by the user prior to the fastening of the lug nut thereto.

5 Claims, 1 Drawing Sheet

WHEEL ALIGNMENT TOOL

BACKGROUND OF THE INVENTION

This invention relates to an automotive alignment tool and more particularly to a wheel mounting/alignment tool and method for mounting a vehicle wheel, particularly a "mag" wheel, to a vehicle hub.

Upon mounting "mag"-type wheels to a vehicle hub the lug bolts of the vehicle hub should be properly aligned within the apertures of the vehicle wheel. If misaligned, the lug nuts upon tightening and/or removal may mar the annular edges defining the wheel apertures. This deformation is more probable in "mag"-type wheels as such wheels do not have cone-shaped lug bolt apertures for guiding the lug nut onto the bolt and into a proper relationship with the wheel aperture. Thus, the misaligned bolt can mar the relatively soft metal alloy utilized in "mag"-type wheels. Moreover, the misalignment of one lug bolt/aperture can result in the misalignment of the remaining bolt/aperture combinations. Thus, the probability of wheel damage increases.

Furthermore, it is also desirable during the mounting and removal of "mag"-type wheels to preclude the possibility of the wheel from slipping and falling onto the lug bolts projecting through the wheel apertures. The contact of the lug bolts with the annular edges of the wheel apertures can cause undesirable damage/deformation thereto.

In response thereto, I have invented a wheel mounting/alignment tool and method of utilizing the same which effectively aligns the lug bolts with the wheel apertures and maintains this alignment during wheel mounting. This alignment and maintenance precludes the lug nuts from damaging the wheel during fastening and holds the wheel in place during mounting and dismounting thereof.

It is therefor a general object of this invention to provide an alignment tool which is utilized in the alignment of the lug bolts of a vehicle hub within the apertures of a vehicle wheel.

Another object of this invention is to provide for an alignment tool, as aforesaid, which assists the user in mounting the wheel on the vehicle hub.

Still another object of this invention is to provide an alignment tool, as aforesaid, which is utilized in the alignment of the longitudinal axis of a lug bolt with an imaginary, normal axis passing through the center of the corresponding lug bolt aperture of the vehicle wheel.

A further object of this invention is to provide an alignment tool which aligns the lug bolts within the vehicle wheel so that the lug nuts will not mar the annular edges of the lug bolt apertures during mounting and removal of the vehicle wheel.

A still further object of this invention is to present a method of mounting a vehicle wheel so that the plurality of lug bolts are effectively aligned within the corresponding apertures of a vehicle wheel.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 4:
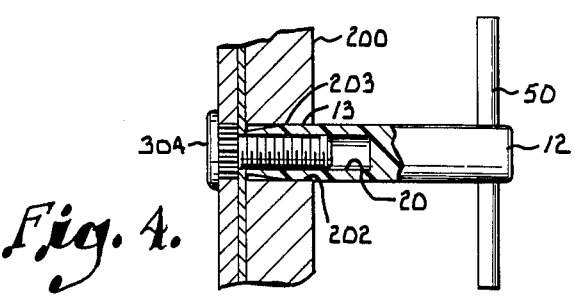
FIG. 4 is a sectional elevation view, taken along line 4—4 in FIG. 4, illustrating the relationship of the alignment tool within the wheel aperture and about the corresponding lug bolt.

Turning more particularly to the drawings, FIG. 4 illustrates the alignment tool 100 as generally comprising a body 10 and handle 50. The body 10 is generally elongated in configuration and presents an integral support housing 12 and tapered head 14. Support housing 12 is cylindrical in configuration with an outside diameter corresponding to the diameter of the lug bolt apertures 202 associated with each vehicle wheel 200. The integral tapered head 14 extends from a line of juncture 16, defining an end of the support housing 12, and diminishes in outside diameter towards the free edge 18 thereof. Centrally extending through the body 10, in longitudinal alignment with the central, imaginary, longitudinal axis passing therethrough, is a cylindrical bore 20 designed for reception of a protruding lug bolt 304 therein.

The annular line of juncture 16 between the cylindrical support housing 12 and the tapered head 14 is positioned towards the free edge 18 of the tapered head 14. Upon insertion of the tapered head 14 through the wheel aperture 202 the free edge 18 abuts the vehicle hub 300 with the juncture 16 positioned within the confines of the wheel aperture 202. The tapered head 14 is preferred as it will not mar the surrounding annular rim defining each aperture 202 during insertion of the tool 100 into a misaligned bolt 304/aperture 202 combination. Accordingly, an annular surface 13 of the support housing 12 is confined within the aperture 202. This surface 13 supports the forward, overlying portion of the annular rim 203 which defines the wheel aperture 202. This relationship precludes undesirable wobble and/or slippage of the wheel 200 relative to the alignment tool 100 and vehicle lug bolt 304.

Figure 1:
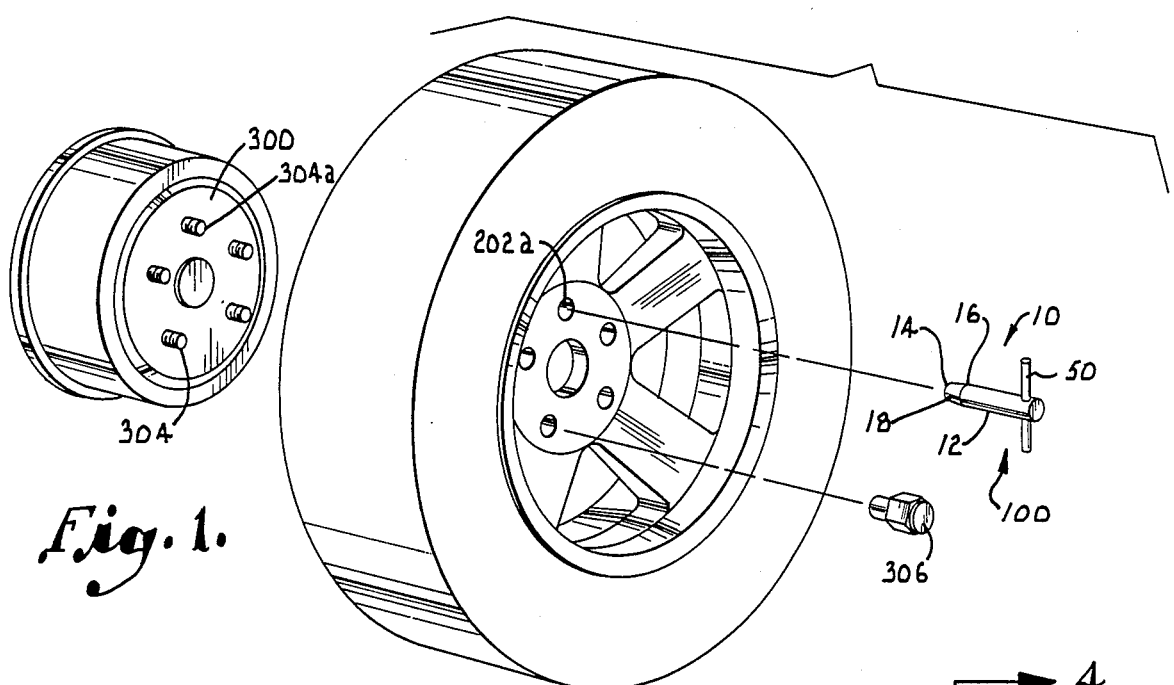
FIG. 1 illustrates a wheel with tire thereon as exploded from the vehicle hub with a lug nut and the alignment tool exploded from the vehicle wheel.
Figure 2:
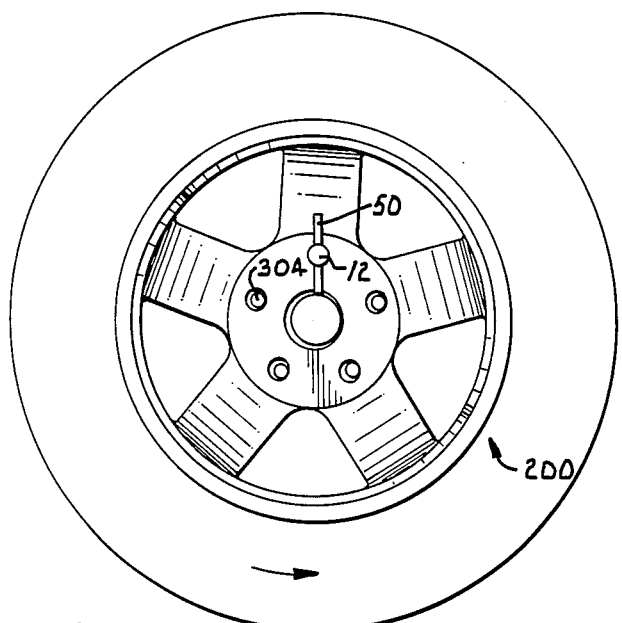
FIG. 2 is a front elevation view of the mounted wheel and illustrating the initial placement of the alignment tool in the twelve o'clock position.
Figure 3:
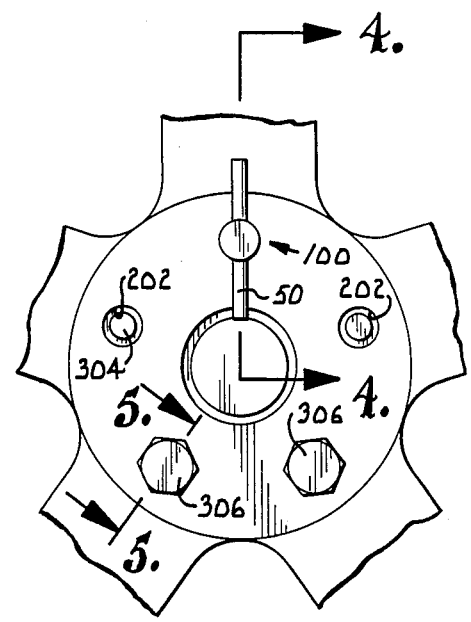
FIG. 3 is a fragmentary view of the vehicle wheel of FIG. 2, on an enlarged scale, and illustrating the desired alignment of the lug bolts within the wheel apertures as well as the affixation of two lug nuts to their corresponding lug bolts.

In use one lug bolt 304a of the vehicle hub 300 is placed at a twelve o'clock position (FIG. 2). An aperture 202a of the wheel 200 is then positioned at a corresponding twelve o'clock position. The user then places the wheel 200 onto the vehicle hub 300 so that at least the twelve o'clock lug bolt 304a of the vehicle hub protrudes through the twelve o'clock aperture 202a of the wheel 200. Once positioned the tapered head 14 of the tool 100 is inserted through the aperture 202a with the bore 20 receiving the lug bolt 304a therein. This reception, as enhanced by tapered head 14, aligns the central, longitudinal axis of the lug bolt 304a with an imaginary longitudinal axis normally extending through the center point of the twelve o'clock aperture 202a. Such alignment results from the cooperation of the central bore 20 with housing 12. As the support housing 12 has a configuration generally congruent with the aperture 202, reception of the lug bolt 304a therein likewise centers the bolt 304a within the aperture 202a.

Figure 5:
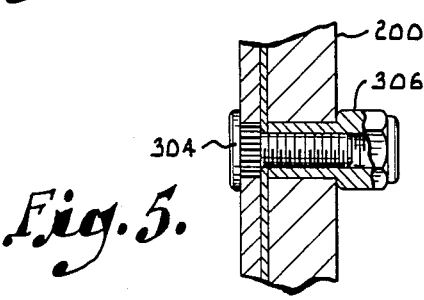
FIG. 5 is a sectional elevation view, taken along line 5—5 in FIG. 3, illustrating the desired relationship among a lug bolt, lug nut and vehicle wheel aperture.

As shown in FIG. 2, the remaining lug bolt 304/aperture 202 combinations are not so centrally aligned. The user then swings the wheel 200 in counterclockwise or clockwise directions about the twelve o'clock pivot point as provided by tool 100. Once the longitudinal axis of the selected lug bolt 304 is colinear with the imaginary longitudinal axis normally passing through the center point of aperture 202, the lug nut 306 is fastened to the protruding end of the lug bolt 304. This relationship assures the user that the lug 306 will not mar the annular rim 203, surrounding the aperture 202, during fastening as it achieves the relationship shown in FIG. 5.

Once the plurality of lug bolt 304/apertures 202 are so aligned and the lugs 306 fastened thereto, the alignment tool 100 is removed. As the lugs 306 have been previously fastened to their corresponding lug bolts 304, the wheel 200 will not shift or otherwise cause the lug bolt 304a/202a combination to shift from its initially aligned position. The last lug 306a is then fastened to the twelve o'clock lug bolt 304a. The vehicle owner is thus assured that all lug nuts 306 are properly within their respective apertures 202 and will not mar the wheel upon their subsequent removal.

Upon removal of the wheel 200, the twelve o'clock lug 306a is removed and the alignment tool 10 is inserted through aperture 202a to receive the lug bolt 304a therein (FIG. 4). The remaining lugs 306 are removed from their corresponding bolts 304. Tool 100 within aperture 202a precludes slippage of the wheel 200. Thus, the wheel 200 cannot drop down which may cause damage to the rims 203 defining the apertures 202.

Once the lug nuts 306 are removed, the wheel 200 is removed from the vehicle hub 300. It is understood that the wheel 200 and tool 100 may be removed as one unit. The wheel 200 is also slidable along the support housing 12 until displaced from the hub 300 and the lug bolts 304. Once so displaced the tool 100 can then be removed. Upon wheel mounting the procedure, as above-described, is then utilized.

Thus, the tool 100 and method as above-described is effective in properly mounting vehicle wheels, particularly "mag" wheels, to a vehicle hub without causing damage thereto.

Accordingly, it is to be understood that while certain forms of this invention have been illustrated and described, it is not limited thereto, except in so far as such limitations are included in the following claims.

Having thus described the invention, what is claimed as new and desired to be secured by Letters Patent is:

1. A tool to facilitate the changing of a vehicle wheel having a plurality of lug bolt apertures on a vehicle hub having a plurality of corresponding lug bolts comprising:

a longitudinal body member having a longitudinal support housing therein, said support housing being generally cylindrical in configuration and having an imaginary longitudinal axis centrally extending therethrough, said configuration generally corresponding to the configuration of an annular rim of said lug bolt aperture in said wheel to allow a slidable fit of said housing in said aperture;

a tapered head extending from a line of juncture defining an end of said support housing, said tapered head presenting a free edge with a diameter less than the diameter of said support housing to facilitate insertion of said tapered head through a selected aperture of said vehicle wheel and contact of said free edge with said hub;

a smooth longitudinal bore centrally extending through said tapered head and into said housing and presenting an aperture at said free edge, said bore having an imaginary longitudinal axis centrally extending therethrough and generally colinear with said housing axis, said bore having a configuration allowing for a full slidable fit of a lug bolt of said vehicle hub therein upon said insertion of said tapered head through said aperture of said vehicle wheel and contact of said free edge with said hub, said line of juncture being displaced from said free edge of said tapered head at a distance whereupon said annular rim of said wheel defining said lug bolt aperture rests on said support housing upon said full slidable fit of said lug bolt in said bore and upon placement of said wheel in a final mounting position relative to said hub, said colinear bore axis cooperating with said colinear support housing axis to centrally align said lug bolt within said tapered head and said aperture while supporting said annular rim on said housing, whereby said tool supports said aligned wheel on said vehicle hub in said final mounting position relative thereto.

2. The tool as claimed in claim 1 further comprising:
a handle at an end of said body for facilitating withdrawal of said tapered head from said aperture.

3. The tool as claimed in claim 1 wherein said outside diameter of said support body corresponds to said diameter of said aperture whereby to preclude displacement between said support body and said wheel upon reception of said lug bolt within said bore.

4. A method of mounting a vehicle wheel having a plurality of lug bolt apertures onto a vehicle hub presenting a plurality of lug bolts extending therefrom by utilizing the tool of claim 1 and comprising the steps of:

(a) positioning one lug bolt of said plurality of lug bolts at a twelve o'clock position;
(b) extending at least said twelve o'clock lug bolt through said aperture;
(c) aligning said lug bolt within said aperture in a preselected position by sliding, without rotation, the tool of claim 1 onto the lug bolt, said tool contacting said hub;
(d) releasably maintaining said twelve o'clock aperture/lug bolt alignment in a manner to provide a pivot axis for said wheel about said tool;
(e) swinging said wheel about said tool in a direction to align another of said lug bolts within said corresponding aperture;
(f) fastening a lug nut to said aligned lug bolt;
(g) fastening a lug nut to each of said other lug bolts extending through said corresponding aperture;
(h) releasing said tool providing said twelve o'clock lug bolt/aperture alignment to allow for fastening of a lug nut thereto;
(i) fastening a lug nut to said aligned twelve o'clock lug nut/aperture whereby to attach said vehicle wheel to said hub.

5. The method as claimed in claim 4 wherein said steps of aligning said lug bolt within said aperture corresponds the central longitudinal axis of said lug bolt with an imaginary axis normally passing through the center point of said aperture.

* * * * *